Patented July 30, 1929.

1,722,780

UNITED STATES PATENT OFFICE.

FREDERICK C. DOUGLAS WILKES AND FRANCIS K. FLYNN, OF NEW YORK, N. Y., ASSIGNORS TO LUCE CANE HARVESTER CORPORATION, OF NEW YORK, N. Y., A CORPORATION OF DELAWARE.

SUGAR-CANE HARVESTER.

Application filed July 29, 1922. Serial No. 578,325.

This invention relates to improvements in cane harvesters and the like, and particularly to means for delivering the cane from the machine free from trash, such as leaves which may be mixed with the cane or secured thereto.

The invention may be used with harvesters of many types, but is particularly useful, and is herein shown and described, in connection with a harvester of the general type described and claimed in the co-pending application of George D. Luce, patented June 9, 1925, Patent No. 1,541,231. In this type of harvester, means is provided for seizing the cane, cutting it first at its butt, conveying it in a substantially standing position and then in a rearwardly inclined position upwardly and rearwardly thru the machine, topping and stripping the cane while so conveyed, and then discharging it from the upper rear end of conveying means. The present invention relates particularly to means for handling the cane after it is discharged from the conveying means, and for removing from it any trash which would otherwise be delivered with the cane.

One of the features of the invention is a transversely arranged bar which engages the cane as it leaves the conveying means and causes it to tip forwardly, thereby insuring that the cane will be delivered butt-first from the rear of the harvester. This feature is particularly, although not exclusively, useful in connection with another feature of the invention which is the trash picker into which the cane is delivered butt-first from the conveying means. Generally speaking, the trash picker is in the form of an inclined trough, the bottom of which is provided with means, such as picker brushes, for removing from the cane any trash that may enter the trough with the latter. Other features of the invention will appear from the following description of one embodiment of it, and will be particularly pointed out in the appended claims.

Figure 1:
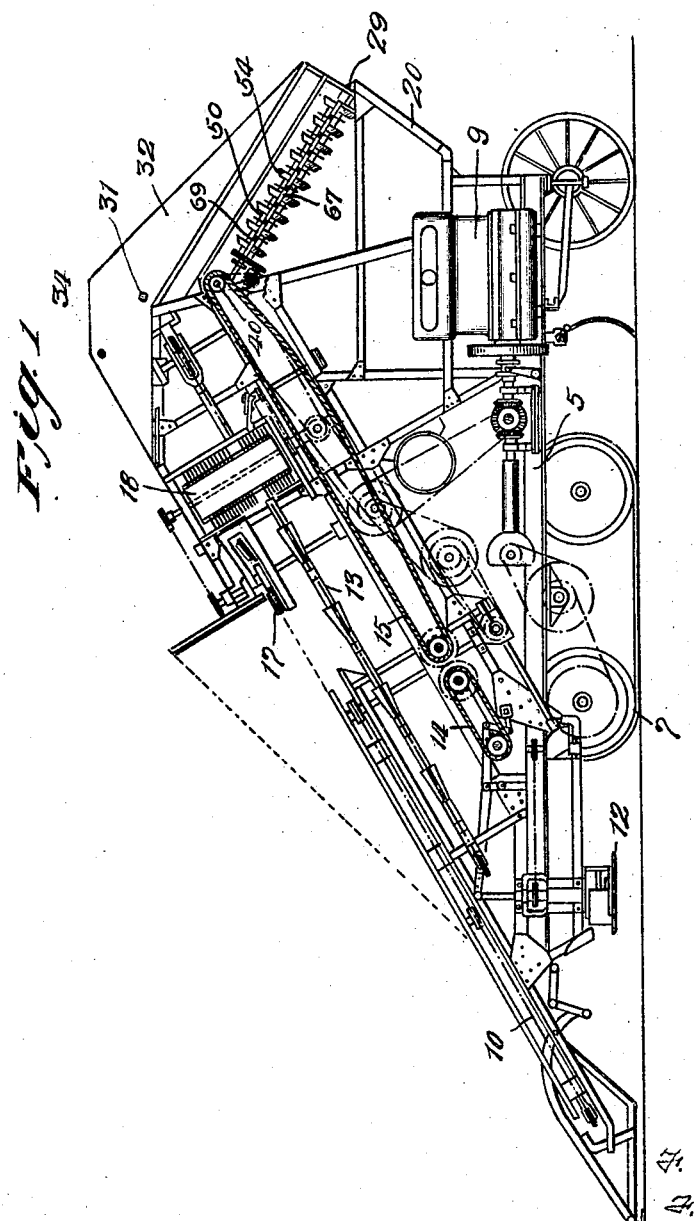
Figure 2:
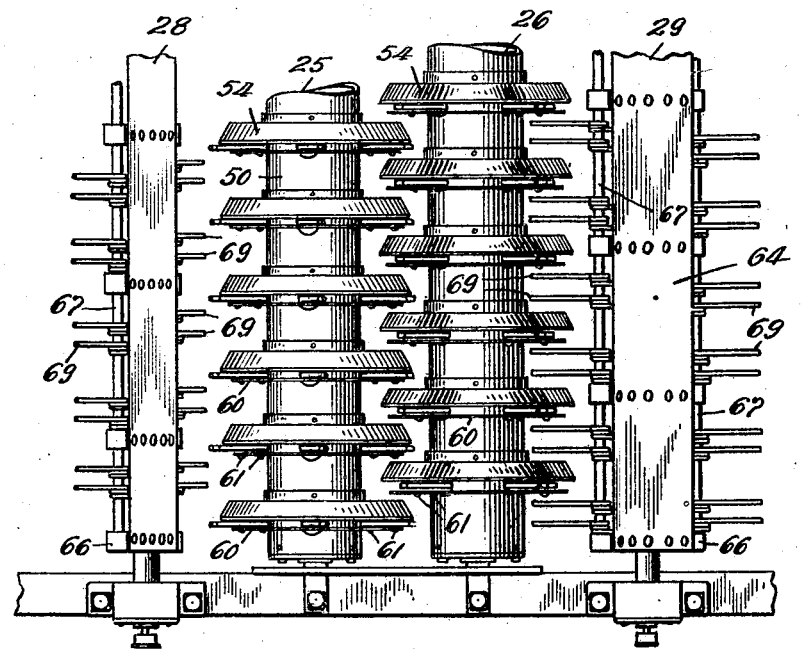
Figure 3:
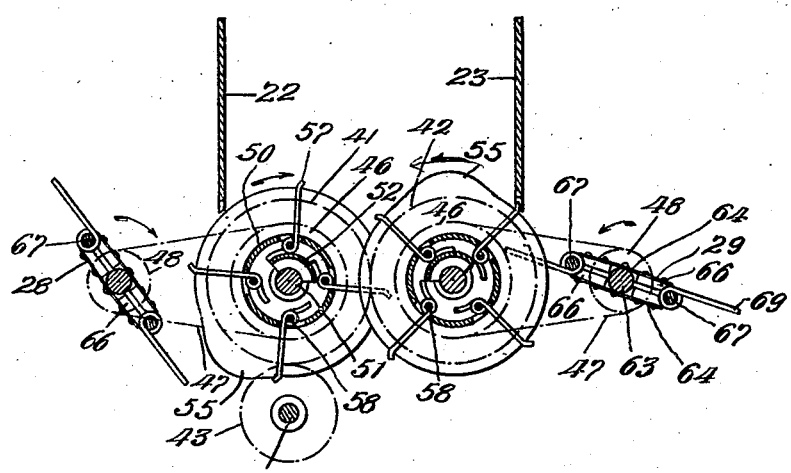

Referring to the drawings, Figure 1 is a side elevation, somewhat diagrammatic in form, of a sugar cane harvester having the present invention embodied therein; Figure 2 is a fragmentary plan view of the trash picker, showing the bottom of the trash picker, showing the picker brushes and the picker brush cleaners and the manner in which they co-operate; Figure 3 is a sectional end elevation through the trash picker.

Referring to Figure 1, the harvester is shown as having a main frame 5 mounted upon caterpillar tractor treads 7, and provided with an engine 9 for propelling the apparatus and driving the various mechanisms thereof.

At the front of the machine are pick-up chains 10, which gather in the cane and hold it while it is cut close to or below the level of the ground by the rotary disc cutters 12, which are shown in their raised or inoperative position. When the cane has been severed from the roots, it is seized by conveyer chains, one of which is indicated at 13, and is conveyed in a substantially up-right position, upwardly and rearwardly thru the machine. As the cane is thus conveyed, the butts engage the forwardly traveling belt 14 which tilts the cane into a somewhat rearwardly inclined position; and the cane is supported in this position by the engagement of the butts with the elevator belt 15. While so conveyed, the tops of the cane are cut off by the topping mechanism 17; and most of the leaves are stripped off by the strippers 18. After being acted upon by the strippers, the cane, which is still held by the conveyor chains 13 in a substantially up-right but slightly rearwardly inclined position, is ready to be delivered to the trash picking mechanism which will now be described. No more detailed description of the general features of the harvester is necessary, since their specific constructions have no bearing upon the present invention.

The trash picker mechanism is shown as mounted at the rear of the harvester upon an auxiliary frame 20 attached to the main frame of the machine. The trash picker is in the nature of an inclined chute having side walls 22 and 23 and a bottom composed of trash picker brushes 25 and 26, which will be hereinafter described in detail. These brushes serve to remove from the cane, as it passes thru the trough, any free trash which may be mixed with the cane and also any trash actually clinging to the cane. In order to clean the trash from the picker brushes 25 and 26, rotary brush clea's 28 and 29, hereinafter described, are provided outside of the trough and in co-operative relation to the picker brushes 25 and 26. As will be obvious from Figure 1, the trash picking mechanism is arranged at an incline below the top of the conveyor belt 15, and is thus adapted to receive the cane stalks therefrom. Owing to the high rate of speed at which the conveyor chains 13 and the belt 15 are operated, the stalks would have a tendency to dive into the trash picking mechanism in a more or less haphazard manner, if it were not for the provision of means for causing the stalks to enter the trash picker butt-first with a sliding motion. This means comprises a rod 31 arranged across the guide walls 32 between which the stalks travel at the upper portion of the machine, this rod being so located that the stalks will engage it and will be tipped in a forward direction after they have left the conveyor chains 13 by the pushing action of the conveyor belt 15. This tipping of the stalks in a forward direction is limited by another rod 34, also arranged between the guide walls 32, but in advance of the rod 31; and the forwardly tipped stalks are thus prevented from falling against succeeding stalks. As the butt ends of the stalks leave the conveyor belt 15, they slide end-wise downwardly over an inclined apron which forms the bottom of the upper end of the trash picker chute; and from this apron the stalks go endwise butt-first downwardly over the picker brushes by which the trash is removed. The stalks are then discharged from the machine, preferably either upon the ground or into a trailing wagon.

The details of the construction of the trash picker brushes 25 and 26 and of the brush cleaners 28 and 29 will now be described. As shown in Figure 1, the brushes and the brush cleaners may be driven thru suitable gearing from some part of the harvester mechanism, for example, the shaft 40 of the pulley at the upper end of the conveyor belt 15. As shown in Figure 3, the rotating parts of the picker brushes 25 and 26 may be geared together by the gears 41 and 42, the gear 41 being driven by a pinion 43 on a shaft 44 driven by the harvester mechanism; and the brush cleaners 28 and 29 are driven thru sprockets 46 carried by the picker brushes 25 and 26, sprocket chains 47 and sprockets 48 secured to the shafts of the brush cleaners. As shown by the arrows in Figure 3, the picker brushes are so driven that their tops rotate towards the center of the trough, and the brush cleaners rotate in the same direction as the brushes with which they co-operate, the speed of the brush cleaners being somewhat higher than the speed of the picker brushes.

The construction of the picker brushes 25 and 26 as shown in Figures 2 and 3, from which it will be apparent that each brush comprises a shell portion 50 arranged to rotate around a stationary shaft 51, which has mounted thereon a longitudinally extending, stationary, segmental cam 52. Secured to the outside of the shell portion 50 of the picker brushes are cams 54 provided with humps 55 and having beveled edges as shown in Figure 2, the cams of the picker brush 25 being arranged to project into the space between the cams of the picker brush 26. These cams serve to support the cane as it passes down the picker chute, and since the cams rotate toward the center of the chute and since they have beveled faces, they exert a rotating and joggling action on the cane stalks while permitting the latter to slide longitudinally down the trough. The trash picking elements of the picker brushes are shown as comprising heavy wire fingers 57, of the form best shown in Figure 3, which are pivotally mounted on shafts or bolts 58 extending longitudinally within the shell 50 which is provided with perforations thru which the outer ends of the fingers 57 project. The inner ends of the fingers 57 are bent out of line with the outer ends of said fingers, and are adapted to engage the outer surface of the cam 52 during a portion of the movement of the shell 50. As will be obvious from Figure 3, the cam 52 is so arranged that the fingers 57 will be held in a substantially radial position while they are moving thru the trough, of which the picker brushes forms the bottom; and after the fingers 57 leave the trough, they will be released by the cam 52 and may have a certain angular movement upon the shafts 58 upon which the fingers are mounted. By thus allowing the fingers 57 to have a certain freedom of movement while they are outside of the trough, the cleaning of the trash from the fingers is facilitated. In order to help support the fingers 57, against the strains that may be put upon them axially of the picker brushes, said fingers are preferably located adjacent one side of the cams 54, and between the cams and discs 60 which are secured to the cams by screws 61. The picker brush fingers 57 are thus capable of yielding somewhat in the planes at right angles to the axes of the picker brushes, which is desirable in the action of the fingers upon the trash mixed with the cane, but said fingers are well supported against movement in other directions.

The function of the brush cleaners 28 and 29 is to strip from the spaces between the groups of cams 54 and from the fingers 57 of the picker brushes, any trash which may tend to adhere thereto. As shown, the brush cleaners 28 and 29 comprise a shaft 63, preferably square except at its ends, to the opposite sides of which shaft are riveted sheet metal members 64. Arranged at intervals between the members 64, are members 66 which project beyond the edges of the sheet metal portions 64, and are provided at their outer ends with holes adapted to receive finger-supporting rods 67. The sheet metal members 64 and the member 66 are preferably riveted together as shown, so as to form a rigid structure on each shaft 63. Mounted preferably in pairs on the rods 67, are fingers 69 preferably of flexible wire bent to the form shown. The outer ends of these fingers 69 project approximately radially from shafts 63, and the inner ends of said fingers project inwardly between the sheet metal portion 64 and into holes drilled in the shaft 63. By this construction, the fingers 69 are held in a manner which permits the fingers to yield to a considerable extent while performing their function. The brush cleaners, not only serve to remove the trash from the picker brushes, but owing to the flat construction of the body portion of the brush cleaners, the latter act to some extent as fans for blowing the trash out of the picker brushes and away from the machine.

While we have shown one form in which our invention may be embodied, it is to be understood that the construction shown may be modified in many respects without departing from the spirit of the invention, and it is our intention to cover such equivalent constructions in the appended claims.

What we claim is:

1. In a sugar cane harvester or the like, means for conveying the cane upwardly and rearwardly thru the machine and for delivering it longitudinally at an elevation in an inclined position, and a downwardly inclined, cane scouring trash picker arranged to receive the so-delivered cane end-wise from said conveying means and to separate the trash therefrom as the cane descends.

2. In a sugar cane harvester or the like, conveying means for conveying the cane in a substantially upright position upwardly and rearwardly thru the machine and for delivering it at an elevation in an inclined position, and a downwardly inclined, cane scouring trash picker arranged to receive the so-delivered cane end-wise butt-first from said conveying means and to separate the trash therefrom as the cane descends.

3. In a sugar cane harvester or the like, means for conveying the cane in a substantially upright position upwardly and rearwardly thru the machine, a transversely arranged bar located adjacent the upper end of said conveying means and adapted to engage the cane and tip it in a forward direction, and a cane scouring trash picker arranged adjacent the upper end of said conveying means and adapted to receive the cane and conduct it longitudinally as the latter descends butt-first from the conveying means.

4. In a sugar cane harvester or the like, means for conveying the cane upwardly and rearwardly thru the machine, a transversely arranged bar located adjacent the upper end of said conveying means and adapted to engage the cane and tip it in a forward direction, another transversely arranged bar adapted to engage and support the cane as it is tipped forwardly by the first-named bar and a cane scouring trash-picker arranged adjacent the upper end of said conveying means and adapted to receive the cane as the latter descends butt-first from the conveying means.

5. In a sugar cane harvester or the like, means for conveying the cane in a substantially upright position upwardly and rearwardly thru the machine, a transversely arranged bar located adjacent the upper end of the conveying means and adapted to intercept and tip the cane forwardly, and a downwardly and rearwardly inclined chute arranged adjacent the upper end of said conveying means and adapted to receive the cane butt-first and conduct it longitudinally downward as it leaves the conveying means.

6. A trash-picker for sugar cane harvesters in the form of an inclined trough down which the cane slides end-wise, the bottom of which is formed by rotating trash picking means adapted to support the cane during its passage thru the trough and remove from the cane the accompanying trash.

7. A trash-picker for sugar cane harvesters in the form of an inclined trough down which the cane slides end-wise, having a bottom composed of a plurality of trash picker brushes, the tops of which rotate toward the center of the trough.

8. A trash-picker for sugar cane harvesters in the form of an inclined trough having a bottom composed of a plurality of picker brushes, the tops of which rotate toward the center of the trough, and brush cleaning means co-operating with said picker brushes located outside of the trough.

9. A trash-picker for sugar cane harvesters in the form of an inclined trough having a bottom composed of a plurality of picker brushes having cams which support the cane and fingers which remove the trash.

10. A trash-picker for sugar cane harvesters in the form of an inclined trough having a bottom composed of a plurality of picker brushes having alternately arranged cams which support and rotate the cane and fingers which remove the trash therefrom.

11. A trash-picker for sugar cane harvesters in the form of an inclined trough having a bottom composed of a plurality of picker brushes having alternately arranged cams with beveled faces which support and rotate the cane and fingers which remove the trash therefrom, the cams and fingers of one picker brush being arranged to extend into the spaces between the cams and fingers of another picker brush, and means for rotating the picker brushes so that the tops will move toward the center of the trough.

12. A trash-picker for sugar cane harvesters in the form of a trough having in its bottom a picker brush provided with cams adapted to support and rotate the cane, and fingers which remove the trash therefrom.

13. A trash-picker for sugar cane harvesters in the form of a trough having in its bottom a picker brush provided with cams having humps thereon adapted to support and rotate and joggle the cane, and fingers which remove the trash therefrom.

14. A trash-picker for sugar cane harvesters in the form of an inclined trough having a bottom composed of a plurality of picker brushes having alternately arranged cams, provided with humps which support and rotate and joggle the cane, and fingers which remove the trash therefrom.

15. A trash-picker for sugar cane harvesters in the form of an inclined trough having a bottom composed of a plurality of picker brushes having cams provided with humps and having inclined faces which support the cane and fingers which remove the trash therefrom.

16. A trash-picker for sugar cane harvesters in the form of a trough having in its bottom a picker provided with cams adapted to support and rotate the cane, and fingers which remove the trash therefrom, and means cooperating with said picker brush located outside of the trough for removing the trash from the brush.

17. A trash-picker for sugar cane harvesters in the form of a trough having a bottom composed of a plurality of picker brushes, the tops of which rotate toward the center of the trough, and rotating brush cleaners located outside the trough and having fingers which remove the trash from the picker brushes.

18. In a trash-picker for sugar cane harvesters or the like, a picker brush having alternately arranged cams and fingers.

19. In a trash-picker for sugar cane harvesters or the like, a picker brush having alternately arranged cams with beveled faces and fingers which project slightly beyond the outer faces of the cams.

20. In a trash-picker for sugar cane harvesters or the like, a picker brush having alternately arranged cams and flexible fingers, the ends of which project slightly beyond the faces of the cams.

21. In a trash-picker for sugar cane harvesters or the like, a picker brush having a stationary shaft upon which is mounted a cam, a shell rotatably surrounding said shaft and cam, cane supportnig cams carried by said shell, and movably mounted fingers carried by said shell, the outer ends of which fingers project slightly beyond the cane supporting cams and the inner ends of which fingers cooperate with the cam mounted upon the picker brush shaft.

22. A trash-picker for sugar cane harvesters comprising discs for rotating the cane and fingers between adjacent discs for removing the trash from the cane.

23. In a cane harvester, in combination, means for cutting the cane, means for conveying the cane upwardly and rearwardly through the machine in an upright position, means for stripping the cane while it is being moved by said conveyor, and a trash picker arranged to receive the cane from the conveyor and separate the trash, including the stripped leaves, from the cane.

In testimony whereof we have affixed our signatures to this specification.

FREDERICK C. DOUGLAS WILKES.
FRANCIS K. FLYNN.